United States Patent Office 3,527,119
Patented Sept. 8, 1970

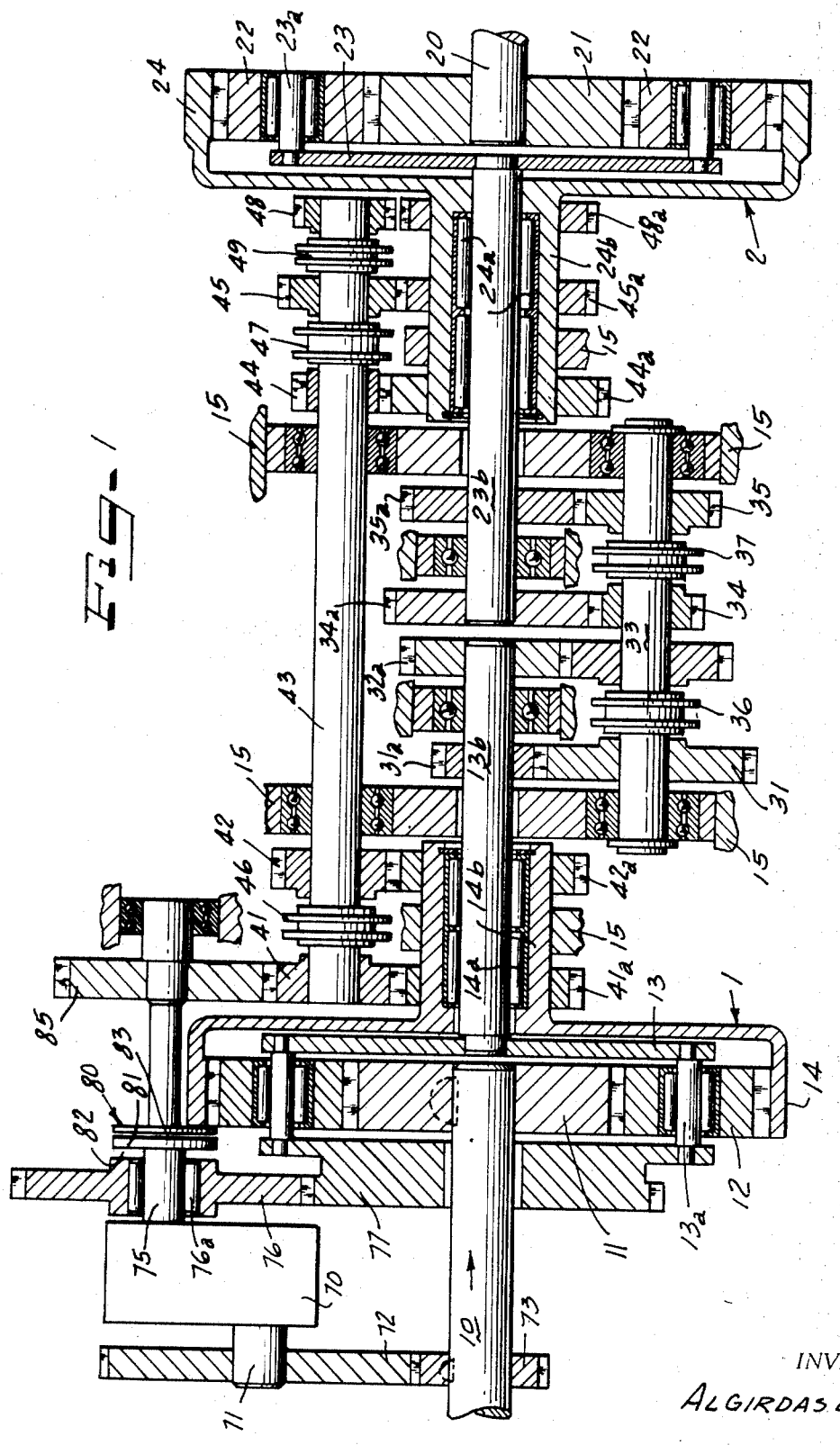

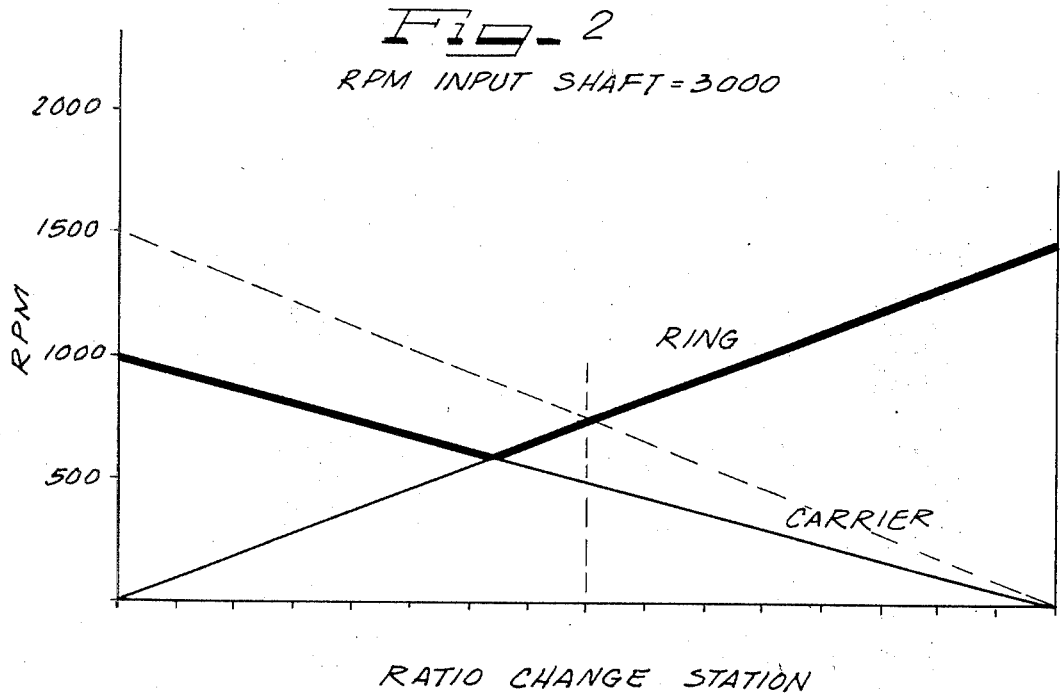
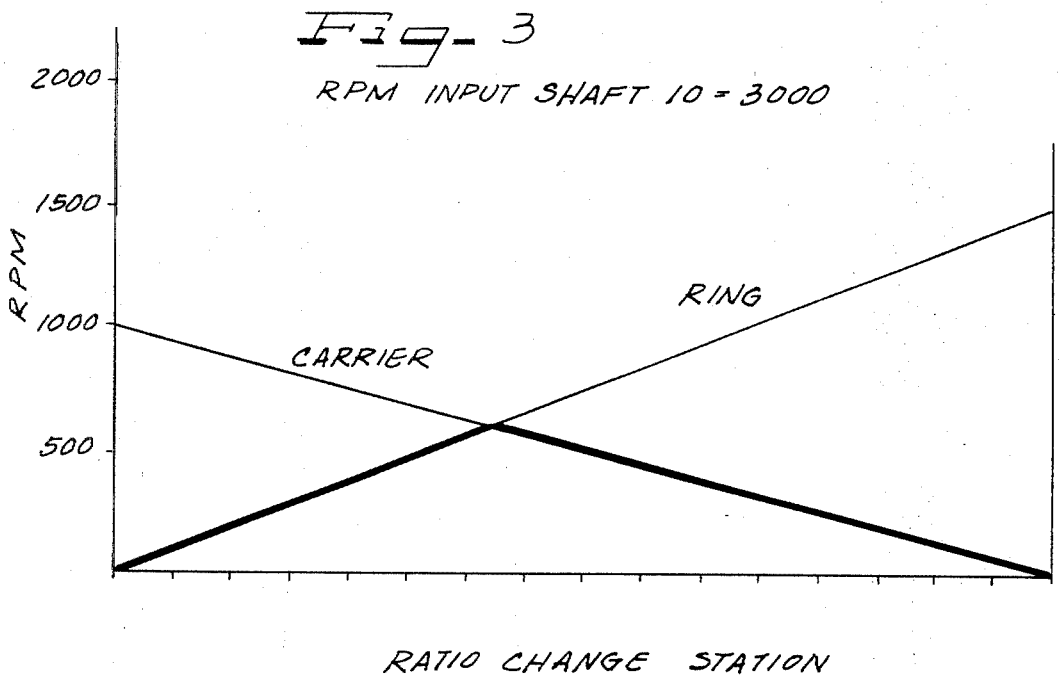

3,527,119
TRANSMISSION
Algirdas L. Nasvytis, 10823 Magnolia Drive,
Cleveland, Ohio 44106
Filed June 6, 1968, Ser. No. 735,024
Int. Cl. F16h *37/06, 9/26*
U.S. Cl. 74—681
8 Claims

ABSTRACT OF THE DISCLOSURE

A novel and improved transmission having a finite number of speed ratios over a wide range and employing a small variable speed drive unit assuming a small portion of the torque load and providing infinite ratios between said finite ratio steps to thereby provide a continuously variable speed transmission when used with a substantially constant speed prime mover. A variable speed drive unit is integrated into a transmission in a manner providing a relatively limited torque transfer by way of the variable speed drive while at the same time providing substantially improved control sensitivity.

BACKGROUND OF THE INVENTION

Variable speed transmission systems embodying a large number of speed shifts have been known in the art. My copending application, U.S. Ser. No. 583,830, filed Oct. 3, 1966, now Pat. No. 3,468,192, discloses a number of variations of such transmissions. The transmissions shown in my above-identified copending application provide a large number of different speed ratio conditions arranged in a manner providing for shifting ratios while maintaining drive-line torque on the transmission. In accordance with the present invention, a variable speed device is integrated into the transmission in a manner providing a smooth speed change between adjacent speed ratios and providing substantially infinite variation in speed ratio between each intermediate speed change.

Although designed to provide an improvement based upon the various transmissions set forth in my earlier copending application, U.S. Ser. No. 583,830, the system of the present invention may be incorporated into transmissions of substantially any design providing multiple power paths with a capability of shifting alternate power paths while in a stopped condition. In accordance with the present invention, a somewhat limited capacity variable speed drive system is inserted between the parallel power paths thereby providing, in combination with the means for sequentially, alternately, stopping rotation of the power paths for purposes of shifting from one to the other, a substantial improvement in over-all performance and efficiency. It may be observed, also, that the present system may be employed with the copending, earlier filed, Nasvytis application, U.S. Ser. No. 730,883, filed May 21, 1968 in which a transmission-neutral condition is provided for in any transmission gear combination.

As shown in my prior application, U.S. Ser. No. 583,830, and particularly in the embodiment shown in FIG. 4, I have illustrated a combined step-by-step multiple ratio transmission having two power paths under the control of a reversible, variable speed motor. By controlling the variable speed motor in a forward or reverse direction, with any number of intermediate ratios therebetween, the output of the transmission may be positively controlled to provide a substantially infinite range of over-all ratios. Although variable speed motors are traditionally considered to be relatively inefficient as transmissions, and particularly when they comprise hydraulic motor-pump combinations such as illustrated in my earlier patent application Ser. No. 583,830, over-all inefficiency is minimized since only a small proportion of the power transmitted by the transmission is handled by the variable speed mechanism. However, by providing the variable speed motor-pump combination, superior transmission control is provided. Satisfactory reversible variable speed pump and gear type variable speed devices are quite expensive, however, and in accordance with the principles of the present invention, a relatively simple transmission combination is provided in which a variable speed drive of the less complex non-reversing type may be employed.

In accordance with the present invention, a transmission having plural power paths is utilized. An initial source of torque, comprising the main transmission torque input from a prime mover or the like, is branched through a gearing connection or the like to a variable speed motor. This unidirectional variable speed motor may be selectively, and alternately, coupled to one or the other of the two plural paths embodied in the transmission. By providing a shift collar or face clutch capable of connecting the variable speed drive to one or the other of the plural power paths of the transmission, the relative speeds of the two power paths may readily be controlled and may be individually separately fixed so that transmission shifting may readily be accomplished between gears on the stopped power path, without requiring brake devices.

It is, accordingly, an object of the present invention to provide a novel smoothly variable transmission.

Another object of the invention is to provide an improved transmission capable of being shifted at full torque and having a substantially infinitely variable ratio throughout its full range.

A feature of the invention resides in the provision of a plural power path transmission coupled with a variable speed drive for controlling the relative speeds of the two power paths.

Still other and further objects and features of the invention will at once become apparent to those skilled in the art from a consideration of the attached drawings and specification.

DESCRIPTION OF THE DRAWINGS

FIG. 1 is a side elevational view in cross-section of a planetary transmission constructed in accordance with the present invention;

FIG. 2 is a chart illustrating one form of speed relationship of the plural power paths of the present invention; and FIG. 3 is a chart illustrating another form of speed relationship shown in FIG. 2.

DETAILED DESCRIPTION

As may be seen from a consideration of FIG. 1, the transmission of the present invention comprises a drive input shaft 10 and an output shaft 20 which comprise, respectively, the shaft for sun members 11 and 21 of input and output planetary systems generally designated 1 and 2. Sun gear 11 cooperates with planets 12 rotatably mounted on carrier 13. Planets 12 cooperate with an internal ring gear 14. Carrier 13 is rotatably carried in fixed housing 15 which supports the transmission by way of a conventional outer closure, not shown. Similarly, ring gear 14 is rotatably carried about the planet shaft 13b by means of roller bearings 14a which cooperate with the ring gear sleeve extension shaft 14b. The basic planetary gear system 2 is preferably identical to system 1, in reverse, all as is shown in my earlier patent application above identified. Accordingly, the output shaft 20 carries output sun member 21 which cooperates in turn with planets 22 carried by output carrier 23 via support axes 23a driven by output carrier shaft 23b. Similarly, output ring 29 has its extension sleeve shaft 24b supported by bearings 24a running on shaft 23b rotatably supported in the fixed frame 15.

In accordance with the present system, a wide range of ratio changes is accomplished by providing two countershafts 33 and 43 which operate to provide a ratio change, respectively, between shaft 13, 23 and shaft 14, 24. This may readily be seen from FIG. 1 where shaft 33 is rotatably mounted on the fixed frame 15 and carries, rotatably mounted thereon, four gears 31, 32, 34, and 35. Shift collars 36 and 37 are splined to the shaft 33 for axial movement thereon, on a selected basis, to cause the engaged gear to shift axially into a condition in which it rotates with the shaft 33. As shown, gears 31 and 32 cooperate, respectively, with gears 31a and 32a fixedly carried by shaft 13b for rotation therewith. Gears 31a and 32a are in constant mesh with their respective gears 31 and 32. Similarly, output gears 34a and 35a are rigidly secured for rotation with shaft 23b and are in constant mesh with their cooperative gears 34, 35. With this arrangement, it will be observed that four different ratios may be provided between carrier 13 and carrier 23 by shifting the clutch yokes or collars 36, 37.

In the same manner as described with respect to the carriers 13, 23, the ring members 14, 24 are interconnected by way of countershaft 43 through four possible gear ratios. These gear ratios are provided by the countershaft gear ratios 42, 42, 44 and 45 which cooperate, respectively, with gears 41a, 42a, 44a and 45a, rigidly secured to the respective input and output ring shaft 14b and 24b. The ratio changes are made by axially shifting the yokes 46, 47 which alternately selectively connect one or the other of the gears to the countershaft 43. A reverse gear is provided by gear 48 carried by countershaft 43, which gear has an idler gear in contact therewith and in contact with reverse gear 48a carried by shaft extension 24b.

Shifting the transmission is accomplished by shifting the yokes 36, 37, 46, 47 and/or 49, and by immobilizing carrier 13 and/or ring member 14. This immobilization was accomplished in accordance with my earlier pending application Ser. No. 583,830 by the provision of brakes or by means of a reversible motor. In accordance with the present invention, immobilization is accomplished by means of a variable speed drive selectively clutched to one or the other of the input drive members 13 and 14. Shifting of the yokes 36, 37, 46, 47 and 49 may be accomplished in any manual or automatic fashion, such yoke shifting devices being conventional. Mechanism for providing such shifts is also fully set forth in my earlier copending applications, and the shifting may be accomplished in accordance with my earlier patent application, U.S. Ser. No. 730,883 wherein a revised transmission-neutral gearing system is described.

In each of the transmissions noted, it is desired that shifting be accomplished during a condition in which one of the power paths is stationary. Under such circumstances, the shifting clutches may be moved readily since the gears thereon are at rest. Preferably, the shifting clutches are of the face-to-face type providing a positive clutch engagement independently of the relative angular position of the clutching faces, so that clutch engagement will be smooth and positive.

The transmission of the present invention provides for rendering the power paths stationary without the application of brakes and, at the same time, with provision for smooth speed transition from one selected speed ratio to the next. This is accomplished as can be seen from FIG. 1 by the provision of a variable speed drive 70 which may be of any conventional form. For example, the variable speed drive 70 may comprise a pair of opposed conical members with a shifting belt or a pair of friction drive plates having a radially shifting force transfer point. Such devices are well known in the art and the specific embodiment employed in this invention forms no part of my invention. The input shaft 71 of the variable speed drive is splined to a gear 72 which is, in turn, in drive connection with shaft 10 by way of gears 73. The output shaft 75 of the variable speed drive 70 rotatably carries gear 76 by way of roller bearings 76a. Gear 76 is in drive contact with gear 77 positively connected to the carrier 13 by way of the carrier axes 13a.

Shifting clutch 80 is diagrammatically illustrated and comprises a shifter 81 movable toward the left to engage clutch face 82 of gear 76 or to the right to engage clutch face 83 on face plate 84 rigidly secured to gear 85 which drives gear 41 on countershaft 43. Gear 85 provides, in effect, input to the ring 14 while gear 76 provides input to the carrier 13.

The transmission shown in FIG. 1, apart from variable speed drive 70 and the components cooperating therewith, preferably comprises a transmission having a large number of ratio steps, such as illustrated in my earlier copending application, U.S. Ser. No. 583,830. When employed with such a transmission, for example, a transmission having sixteen separate finite ratio steps, a very high-over-all ratio change may be provided, but at the same time, a relatively small range of ratios may be required of the variable speed drive. For example, if the ratio step in the main transmission is 1.2 to 1 for each step, the power transmitted through the variable speed drive will be equal to .2 of the total power. This percentage of the power may, of course, be reduced by employing smaller finite steps of ratio change in the main transmission. Operation of the transmission in this manner can be seen from a consideration of the chart of FIG. 2. There, revolutions per minute of the carrier 13 and ring 14 are plotted. In the example shown, the gears 72, 73, 76, 77 and 85 are chosen, with the speed of shaft 10 at 300 r.p.m., to provide a maximum speed of the carrier of 1000 r.p.m. and of the ring of 1500 r.p.m. with the switching point speed of both being approximately 600 r.p.m. Thus, initially, if the carrier 13 is connected to the variable speed drive by way of gear 76 and the variable speed drive is adjusted to provide a full speed rotation of the planet carrier, the ring gear will be stationary. Under such circumstances, the carrier will be rotated by the variable speed drive at the same speed as if the ring gear were in fact braked. By the application of power to the carrier, however, the ring gear shaft 43 will be stationary and shifts may be made in any position on it. By decreasing the variable speed drive output speed the carrier speed will decrease and, as a result, the ring gear will increase in speed. Continual reduction in speed of the carrier, with a corresponding increase in speed of the ring will cause the ring gear and carrier speeds to be identical at a cross-over or switching speed at which speed the shifter 81 may be switched from a connection with the gear 76 to connection with the gear 85 or left unconnected. This shift is readily accomplished since both components are traveling at identical speeds and no synchro-mesh shifting is required. After the shift has been made, increasing the ring speed, by increasing the variable speed drive, the carrier speed will decrease further, ultimately to zero and the ring speed will proceed to its maximum. As a result, the transmission will move from a condition in which the ring shaft 43 is at zero speed continuously variably to a condition in which the ring shaft is at a maximum speed and the carrier shaft 33 is stopped, at which condition gears on the carrier shaft 33 may readily be shifted to provide the next step in transmission ratio.

As above described, the variable speed drive need only provide the ratio change between speeds of 600 r.p.m. and 1500 r.p.m. Thus, if gears 72 and 73 are chosen to drive shaft 71 at 600 r.p.m. when the shaft 10 rotates at 3000 r.p.m., the variable speed drive need only be adjustable between 1:1 and 1:2.5. With such a construction, although the individual countershafts 33 and 43 will alternately be stationary, the ratio change throughout the useful range of the over-all transmission is smoothly varied from the ratio of zero through the maximum transmission ratio, even though the input shaft 10 may be of substantially constant rotational speed. If the ratio between gears 77 and 76 is changed to increase the speed of gear 76 1½ times, the over-all ratio of the variable speed drive will be reduced to 2:1. The identical speed point would then be at 750 r.p.m. and the maximum speed of the carrier and the ring would then be identical at 1500 r.p.m. (as shown in the dotted line on FIG. 2).

The same effect can be obtained, decreasing the speed of the ring 1½ times. The transition point will then be at 500 r.p.m. In general, one output of variable speed drive should be decreased or other increased $$\frac{R_{p1}}{R_r} = \frac{R_r + 1}{R_r}$$

times where $R_r$ and $R_p$ are the reduction ratios on ring and carrier in the first planetary of the drive.

In FIG. 2, the solid heavy line having a generally V-shaped illustrates the relationship when the variable speed drive is connected to the carrier from the point at which the ring gear is stationary to the point at which the ring gear and carrier are rotating oppositely at identical speeds of approximately 600 r.p.m. (or 750 r.p.m.). At that point, as above noted, clutch faces 82 and 83 are rotating at the same speed and the variable speed drive is increased in speed until the ring is driven at its maximum speed and the carrier is stationary. It is important that the gears be matched so that at the point of changeover the clutch faces are rotating at the same speed and in the same direction.

A second mode of operation for the variable speed drive may be seen from a consideration of FIG. 3 where the V is upsidedown. There, at the point of initial operation, the ring is stationary and a variable speed drive is connected to the ring, by shifting the shifter 81 to connect shaft 75 with gear 85. With this shift, a variable speed drive providing a zero output upon rotation of the input shaft 10 at 3,000 r.p.m. is provided, and a variation of the output of the variable speed drive from zero r.p.m. to provide 600 r.p.m. of the ring is provided. At attainment of the speed of 600 r.p.m., the shift may be made, as before, and again the variable speed drive output is reduced to zero controlling the speed of the carrier to zero. Manifestly, this control provides the same continuous change in ratio between steps in which the carrier and ring are alternately stopped.

This mode of operation is applicable for variable speed drives operating from infinite ratio (zero output) to certain maximum speed. For example: Zero-Max, Graham and other variable speed drives of this type. This mode requires much less power flow through the variable speed drive than the first mode. In the first mode, the maximum power flow through the variable fluid drive occurs when one element of planetary is stationary. For this second mode, at this condition there will be no power flow through the variable speed drive. For a given example of the ratio of ratios on countershafts of 1.2, the maximum power flow for first mode is 20%, for second mode, 9.1%.

Numerous advantages are achieved through the utilization of the variable speed controlled transmission as above set forth. The capacity of a variable speed drive or ordinary configuration, such as conventionally used and as contemplated at 70, is relatively low, unless expense is very high. By utilizing such a variable speed drive as the control for a transmission having a large number of finite steps, the power through the variable speed unit remains low and at the same time very large amounts of power can be passed through the over-all transmission. Further, the efficiency of variable speed drives is relatively low. When coupled, as in the case of the present invention, with a transmission having a large number of finite steps, the inefficiencies associated with the transfer of full power and accordingly, an over-all efficiency in the range of 95% is still readily possible. The power passing through the variable speed drive 70 can be reduced further by providing in the basic transmission, finite ratio steps that are closer together than the 1.2 to 1:2.5 above mentioned. Further, the transmission is an ideal torque amplifier (constant horse power device), in which the signal variable speed drive operates always in the same torque range, disregarding the total ratio. The total ratio range in this transmission can, of course, be extended to any limit desired by adding additional gearing in the counter shafts.

Further variations may similarly be made in accordance with the teachings of the present invention without departing from the novel concepts thereof. Accordingly, it is my intent that the scope of the invention be limited solely by that of the hereinafter appended claims.

I claim as my invention:

1. In combination in a plural power path transmission providing a plurality of ratios and having means changing ratios while holding a selected one of the power paths stationary and the other under load, a planetary input system comprising a first input sun gear member, first input planet carrier means carrying a first set of planet gear members and driving one of said power paths, and a first input ring gear member driving one of said power paths, means selectively stopping rotation of said power paths individually, said means comprising variable speed drive means having input means and output means providing variable speed rotation of a shaft, first drive means connected to said planet carrier means, second drive means connected to said first ring gear member, and clutch means shiftable to connect said shaft to said first drive means or said second drive means whereby said first planet carrier and said first ring gear may be alternately stationary or at maximum drive speed without brake application.

2. The transmission set forth in claim 1 wherein said variable speed drive input means is drivingly connected to one of said planetary input means.

3. The transmission set forth in claim 1 wherein said variable speed drive input means is drivingly connected to said first input sun gear member.

4. The transmission set forth in claim 1 wherein said clutch comprises shiftable face-to-face clutch means engageable in any relative angular position.

5. The transmission set forth in claim 1 wherein full speed of said variable speed shaft when geared to second drive means holds the carrier member stationary.

6. The tranmission set forth in claim 1 wherein connection of said variable speed shaft at zero speed to said first drive means rotates said ring gear member at maximum speed and vice versa, and subsequent increase in speed of said shaft upon such connection rotates said carrier means and ring gear member at intermediate speeds, the maximum speed of said variable speed shaft comprising the speed at which the first and second drive means are rotated at the same speed.

7. The transmission set forth in claim 1 wherein said first sun gear is rotated at substantially constant speed.

8. The transmission of claim 5 wherein the minimum speed of said variable speed shaft comprises the speed at which first and second drive means are rotated at the same speed.

References Cited

UNITED STATES PATENTS

| | | | |
|---|---|---|---|
| 2,093,236 | 9/1937 | Dodge et al. | 74—691 X |
| 3,204,486 | 9/1965 | DeLalio | 74—687 |
| 3,340,749 | 9/1967 | Magg et al. | 74—689 |
| 3,427,899 | 2/1969 | Gunderson et al. | 74—687 |

FOREIGN PATENTS 118,488  7/1930  Austria.

DONLEY J. STOCKING, Primary Examiner

T. C. PERRY, Assistant Examiner

U.S. Cl. X.R.

74—682, 689